Nov. 21, 1933.  T. K. CUMMINS  1,936,009
CABLE CLAMP
Filed March 3, 1932   2 Sheets-Sheet 1

INVENTOR
THOMAS K. CUMMINS
BY Paul, Paul & Moore
ATTORNEYS

Nov. 21, 1933.  T. K. CUMMINS  1,936,009
CABLE CLAMP
Filed March 3, 1932   2 Sheets-Sheet 2

INVENTOR
THOMAS K. CUMMINS
BY Paul, Paul + Moore
ATTORNEYS

Patented Nov. 21, 1933

1,936,009

UNITED STATES PATENT OFFICE 1,936,009

CABLE CLAMP

Thomas K. Cummins, St. Paul, Minn., assignor to Northern Malleable Iron Company, St. Paul, Minn., a corporation of Minnesota Application March 3, 1932. Serial No. 596,524

6 Claims. (Cl. 24—126)

This invention relates to cable clamps adapted securely to anchor the end of a cable such as a guard rail cable, electric power cables, telephone lines, and the like, and which may also be used for splicing such cables.

It is an object to provide a cable clamp having a cable-receiving recess of such construction that when a stranded cable is inserted therein, the strands of the cable may readily be separated to provide for easy insertion of a clamping wedge.

Another object is to provide a cable clamp of the character described having a cable-receiving recess provided with grooves or ridges extending parallel to the longitudinal axis of the recess whereby to provide for accurate location of the cable strands and to assure uniform pressure of the clamping wedge upon all of the strands.

A further object is to provide a cable clamp having two recesses therein extending substantially parallel to the longitudinal axis of the clamp, one of said recesses being adapted to receive a cable end and the other, a tie rod or anchoring bolt.

In general, it is my object to provide an improved cable clamp of simple and inexpensive construction, which is highly efficient in use, and which possesses many novel features of construction and practical advantages.

In the accompanying drawings I have shown several practical embodiments of my invention but it is to be understood that the drawings are illustrative, merely, and that I do not limit myself to the details of construction therein shown. Other forms of the invention may be made without sacrificing any of its advantages and without departing from the scope thereof, as defined in the appended claims.

Figure 1:
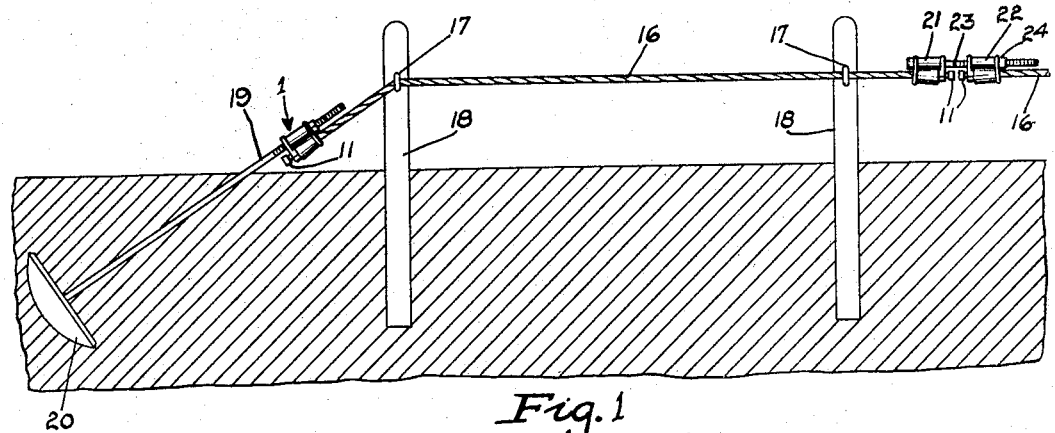
Figure 1 is a view, partly in elevation and partly in section, showing my invention in use as an end clamp and splice for a cable guard.
Figure 2:
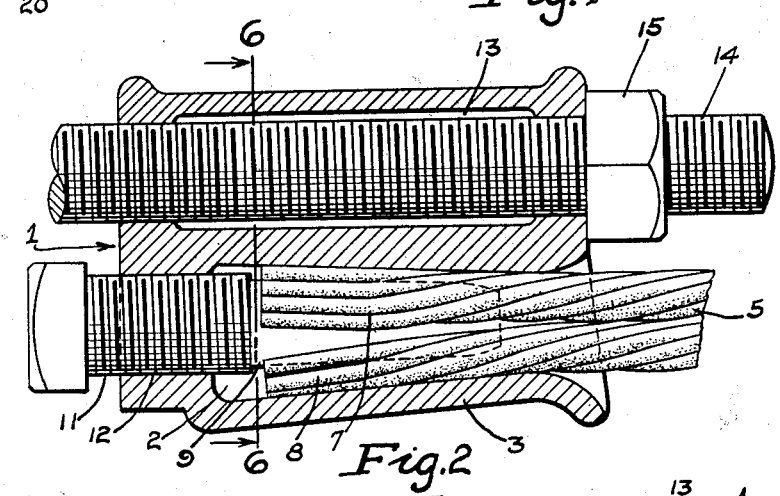
Figure 2 is a sectional view of my cable clamp.

Referring now to the drawings, and particularly to the embodiment of the invention illustrated in Figures 1 to 8, my cable clamp comprises a body portion indicated by the reference numeral 1 having a cable-receiving recess 2, which recess is slightly tapered as is clearly shown in Figure 2. The portion of the clamp in which the cable-receiving recess is provided is of substantially triangular form as indicated at 3. The walls of the cable-receiving recess may be flattened at the corners of the triangle as indicated at 4 for a purpose presently to be described. This arrangement is such that the cable-receiving recess provides, in effect, three cable-receiving grooves in each of which will be located a strand of the cable when the cable is clamped in position.

Figures 3, 4, 5, 6:
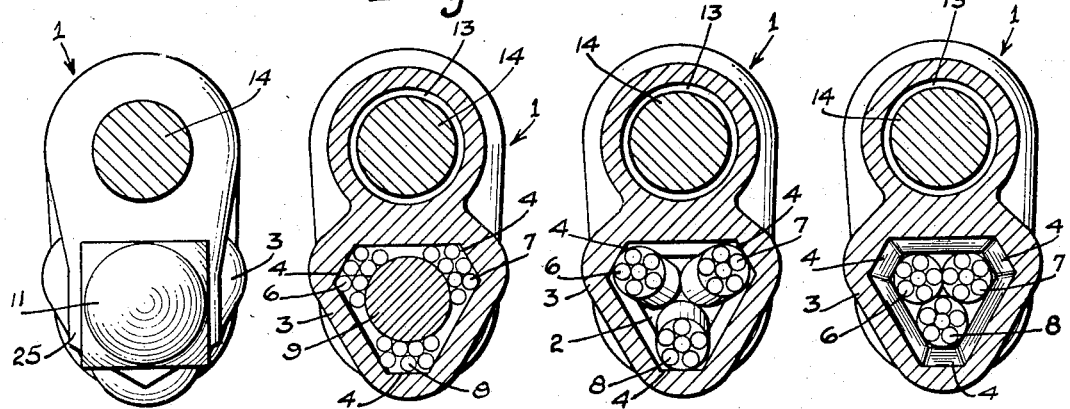
Figure 3 is a view in end elevation of my cable clamp.
Figure 4 is a sectional view through my clamp showing the cable inserted therein without the strands being separated.
Figure 5 is a view similar to Figure 4 showing the strands separated to receive the clamping wedge.
Figure 6 is a sectional view on line 6—6 of Figure 2, showing the clamping wedge in position.

I have found that in this arrangement, wherein the cable receiving recess is provided with grooves in which the strands of the cable engage, I can insert the cable into the recess and then, by twisting the cable in the direction opposite to its normal twist, the strands within the recess will be separated and will lodge in the corners of the triangular space. In Figure 4 the position of the cable is shown as it is inserted into the recess and in Figure 5, the strands are shown to be separated as the result of twisting the cable after it has been inserted into the clamp. This is an important feature of my invention and is of very great advantage in the use thereof. Much difficulty has heretofore been encountered with cable clamps of this general nature because it has been practically impossible so to separate the strands of the cable that the clamping wedge will be accurately located to assure a uniform pressure of the wedge upon all of the strands of the cable and a uniform distribution of said strands with respect to the wedge and the walls of the cable-receiving recess.

In the embodiment of the invention illustrated in Figures 1 to 8, I have shown my clamp used in connection with a cable 5 which is composed of three strands 6, 7 and 8 each of which is made up of a number of individual wires. This type of cable is, of course, well known and no further explanation of its construction is required.

Figures 7, 8:
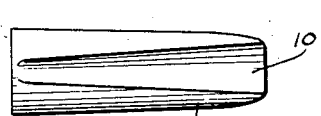
Figure 7 is a side elevation of the clamping wedge.
Figure 8 is an end elevation of the clamping wedge.

My clamp includes a clamping wedge 9 which is shown in detail in Figures 7 and 8. This clamping wedge is provided with three grooves 10 so that its body portion is substantially triangular in cross section as shown in Figure 8. The grooves 10 in the clamping wedge cooperate with the portion 4 of the cable-receiving recess to securely clamp the strands of the cable in proper position when the wedge is driven into the cable. For the purpose of driving the wedge 9 into position, I provide a bolt 11 which is received in a threaded opening 12 in the end of the body portion 1.

Figure 6 is a view in cross section on line 6—6 of Figure 2 and shows the clamping wedge in position, securely clamping the individual wires of the strands 6, 7 and 8 between the surface of the wedge and the walls of the cable-receiving recess.

By the arrangement I have described, in which by a single twist of the cable the strands thereof are readily separated, as shown in Figure 5, it will be clear that the wedge 9 may be accurately located to provide a uniform distribution of the pressure of the wedge and uniform distribution of the strands of the cable. Moreover, the separation of the strands of the cable as shown at Figure 5 facilitates the insertion of the wedge and its proper location.

The body portion 1 of my clamp has a second recess or aperture 13 which is provided for the reception of a tie bolt or anchor bolt 14 which is provided with a nut 15.

As heretofore indicated, my cable clamp may be used in connection with cable guards or fences used along highways. In Figure 1 I have shown my clamp used for that purpose. In this figure, reference numeral 16 indicates a wire cable which passes through suitable eyebolts 17 secured to suitable fence posts 18. In order to securely anchor the end of the cable 16, it is clamped in a clamp of my invention and an anchoring bolt 19 is passed through the recess or aperture 13. This anchoring bolt may be provided with a suitable anchor 20 which is securely embedded in the ground. It will be understood of course that the slack in cables of this sort is usually taken up by some sort of power means and it is not to be expected that the turning of the nut on the anchoring bolt 19 will serve to take up the slack in the cable and to make it taut. However, when the greater part of the slack has been taken up, the turning of the nut on the anchoring bolt 19 will operate to take up the remaining slack and make the cable taut.

In Figure 1, I have also shown my clamp used as a cable splice. This is shown at the right hand side of Figure 1 in which the splice is shown to consist of two of my clamps indicated by reference numerals 21 and 22. These are of identical construction and each serves to clamp the adjacent ends of the cables. In this form, a tie bolt 23 passes through the recesses 13 of the clamps and the nut 24 is employed to draw the clamps together. This structure then provides a simple cable splice and operates to produce the same result as a turn buckle. Again, it is to be understood that the greater part of the slack in the cable will be taken up by other means and that the turning of the nut 24 on the tie bolt 23 serves to complete the tightening operation.

To facilitate installations in the field where a bench vise could not readily be used, I have formed the end of the body portion 1, at 25, for the reception of a suitable standard wrench.

Figure 9:
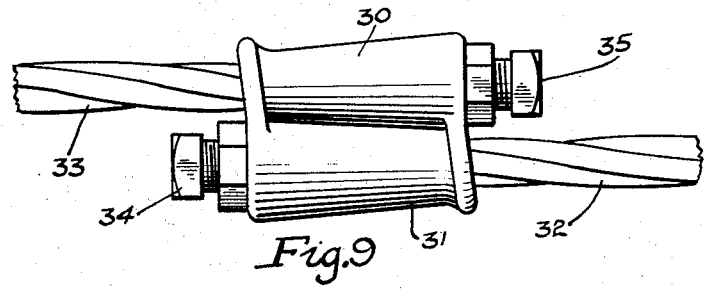
Figure 9 is a view in side elevation of a modified form of clamp for use as a splice.

In Figure 9, I have shown a modified form of the invention which is particularly adapted for use as a cable splice. In this modification the bolt or rod receiving part of the clamp is omitted and I provide two cable-receiving parts 30 and 31 which are identical in construction and of the same character as that shown in Figure 2. To use this form of my clamp as a splice it is necessary only to insert the ends of the cables 32 and 33 into the respective clamps and then drive home the clamping wedges by turning the bolts 34 and 35. Of course, it will be appreciated that this structure cannot function as would a turn buckle to draw the ends of the cables together; other means will be used in the field for stretching the cables and taking up the slack.

Figure 10:
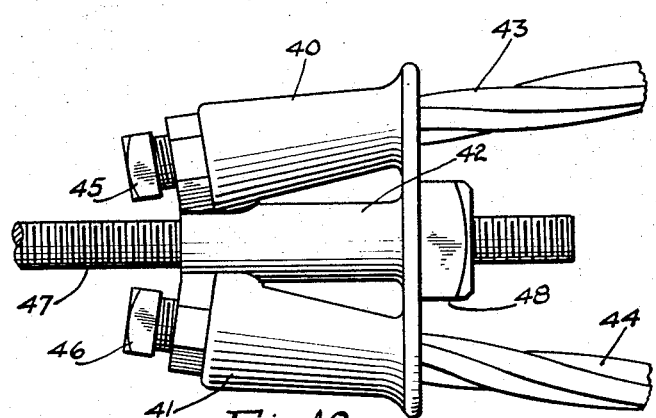
Figure 10 is a view in side elevation of a form of clamp which may be used to clamp the ends of a two-cable installation.

In Figure 10, I have shown another modification of the invention which is particularly adapted for use in anchoring the ends of the cables of a two-cable installation. In this structure I provide an integral casting comprising two cable-receiving elements 40 and 41 and a bolt-receiving element 42 located therebetween. The interior construction of the cable-receiving elements 40 and 41 is the same as that shown in Figure 2. In this device the adjacent ends of the two cables 43 and 44 are inserted into the cable-receiving elements 40 and 41 and are clamped therein by clamping wedges which are driven by turning the screws 45 and 46. A tie bolt or anchoring rod 47 is passed through the bolt-receiving part 42 and is provided with a nut 48 by turning of which the clamp may be used for taking up, to some extent, the slack in the cables. This structure shown in Figure 10 will find its greatest utility in connection with the anchoring of the ends of the cables, where two cables are used, in place of the single cable shown in Figure 1.

Figures 11, 12:
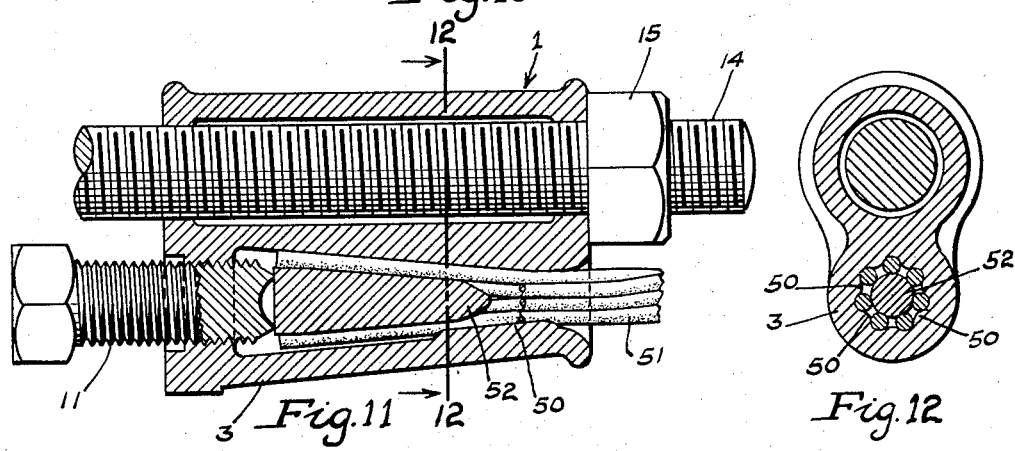
Figure 11 is a sectional view through a modified form of clamp adapted particularly for use with multiple wire cables.
Figure 12 is a sectional view on line 12—12 of Figure 11.

My invention is not limited in its use to the type of stranded cable heretofore described but may be employed equally effectively with the single strand type of cable which is composed of a plurality of individual wires twisted together. Such a single strand cable may be used for electric power transmission and numerous other purposes. In Figure 11, I have shown a modification of my clamp adapted particularly for use with the single strand multiple wire type. The construction of the clamp is, in general, the same as that shown in Figure 2 except that at the end of the cable-receiving recess, where the cable enters the clamp, I have provided a plurality of ridges or ribs 50. The number of such ribs or ridges may be varied in accordance with the number of wires in the cable, although an exact proportion will not be necessary. For example, in the embodiment shown in Figure 11, the cable 51 is composed of seven wires, one in the center and six around the outside. In that case, I may provide the cable-receiving recess with seven ribs or ridges so that each of the wires of the cable may be engaged in the groove formed by adjacent ribs or ridges. Thus, the wires of the cable will be firmly held in the recess and, if now the wire be twisted in a direction opposite to its normal twist, it is found that the ends of the wires within the recess will be separated to provide for ready insertion of the wedge 52.

Figures 13, 14, 15:
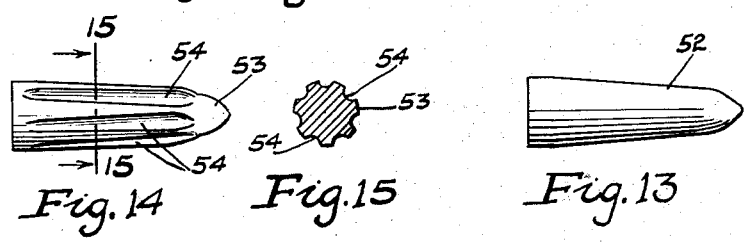
Figure 13 is a view in side elevation of the clamping wedge shown in Figure 11.
Figure 14 is a view in side elevation of a modified form of clamping wedge; and, Figure 15 is a sectional view on line 15—15 of Figure 14.

In this embodiment I employ a wedge 52 which is shown in Figure 13 and which is of generally conical form. However, it may be desirable to provide a wedge having grooves therein, and in that case, the number of grooves will be varied in accordance with the number of wires in the cable. In Figures 14 and 15 I have shown such a wedge which is designated by the reference numeral 53 and which is provided with a plurality of grooves 54.

It will be noted that in the several embodiments of my invention, the grooves or ridges in the cable-receiving recess extend substantially parallel to the longitudinal axis of the clamp. It has heretofore been proposed to employ helical grooves in the cable-receiving recess and the clamping wedge but such grooves will not produce the result of separating the strands, as herein described, but tend on the contrary, to maintain the strands in close contact. Thus, in such a clamp, it is difficult to introduce the clamping wedge and there is no assurance of uniform distribution of the strands and equal pressure of the wedge thereon.

It is not necessary, in carrying out the objects of my invention, that the grooves or ridges in the cable-receiving recess shall extend the entire length of said recess. It would be sufficient if the grooves or ridges are formed at the entrance to the said recess to provide for a firm holding of the cable so it may be twisted at a point outside of the clamp with the results hereinbefore described. Nor is the invention limited to any particular number of grooves or ridges; the number may be varied in accordance with the size and character of the cable or wire which is to be clamped.

From the foregoing it will be seen that I have provided a cable clamp which is of very simple and durable construction, which can readily be installed in the field without the use of special tools and which, in use, is highly efficient. In tests made of my clamp it has been found that under enormous tension, steel cables have been broken without the cable pulling out of the clamp.

I claim as my invention:

1. A clamp for stranded cables having a cable-receiving recess adapted to receive the end of a cable, and means in said recess for engaging and holding the strands of said cable, whereby upon twisting the cable outside of said recess the strands within said recess will be separated.

2. A clamp for stranded cables having a cable-receiving recess adapted to receive the end of a cable, a clamping wedge adapted to be inserted in said recess to clamp said cable against the wall of said recess, and means on the wall of said recess for engaging and holding the strands of said cable, whereby upon twisting said cable the strands within said recess will be separated to provide for entry of said clamping wedge.

3. A clamp for stranded cables having a cable-receiving recess adapted to receive the end of a cable, and a plurality of ribs on the wall of said recess at the end thereof into which the cable is inserted, said ribs being adapted to engage and hold the strands of said cable, whereby upon twisting the cable outside of said recess the strands within said recess will be separated.

4. A cable clamp comprising a body portion provided with a cable-receiving recess, and a plurality of grooves in said recess extending substantially parallel to the longitudinal axis of said clamp, and a clamping wedge adapted to seat in said recess and provided with a plurality of grooves parallel to the grooves in said recess.

5. A cable clamp comprising a body portion having a cable-receiving recess of generally triangular form, and means adapted to be inserted in said recess to clamp a cable in the corners of said triangle.

6. A cable clamp comprising a body portion having a tapering cable-receiving recess of substantially triangular form at least at one end, and means adapted to be inserted in said recess for clamping a cable in the corners of said triangle.

THOMAS K. CUMMINS.